Patented Feb. 25, 1930

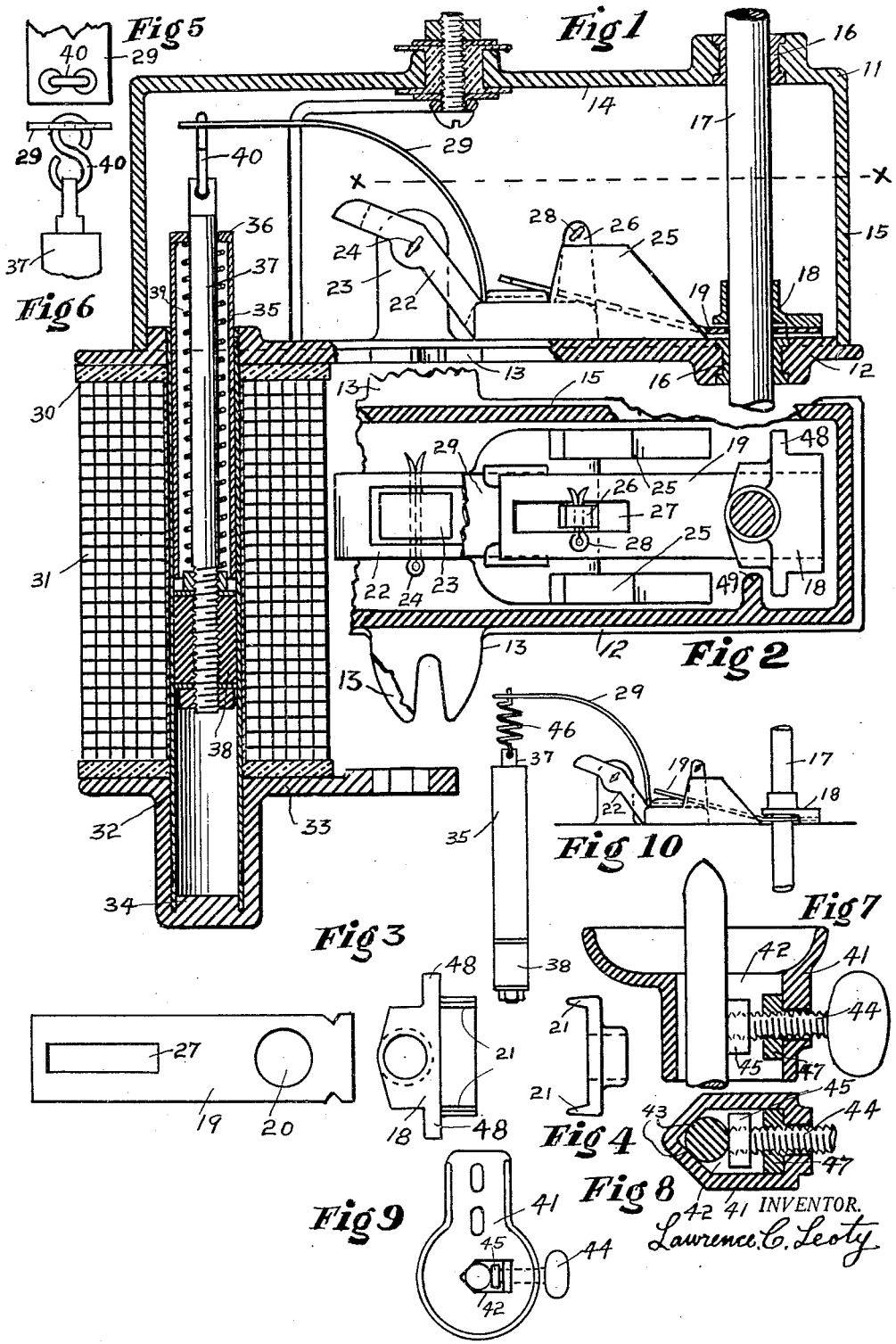

1,748,073

UNITED STATES PATENT OFFICE

LAWRENCE C. LEOTY, OF DAYTON, OHIO

CARBON-FEEDING DEVICE FOR ARC LAMPS AND THE LIKE

Application filed January 3, 1927. Serial No. 158,684.

This invention relates to a carbon feeding device for arc lamps and the like.

One object of the invention is to provide a device which will automatically advance the carbon in such a manner as to maintain a continuous arc, that is, will avoid the breaking of the arc and the establishment of a new arc upon each feeding operation.

A further object of the invention is to provide such a device which will operate satisfactorily with alternating currents both of low frequency and of high frequency.

A further object of the invention is to provide such a device which will be simple in its construction and operation and which can be produced at a relatively low cost.

Other objects of the invention will appear as the device is described in detail.

In the accompanying drawings Fig. 1 is a vertical sectional view taken through a feeding device embodying my invention; Fig. 2 is a transverse sectional view taken on the line x—x of Fig. 1; Fig. 3 is a bottom plan view of the clutch and its actuating arm, showing the same separated; Fig. 4 is an end elevation of the clutch before the arm is connected therewith; Fig. 5 is a detail view of one end of the spring forming part of the actuating device; Fig. 6 is a detail view showing the connection between the solenoid rod and the actuating device; Fig. 7 is a vertical sectional view of the clamp for the lower carbon; Fig. 8 is a transverse sectional view of said clamp; Fig. 9 is a plan view of said clamp; and Fig. 10 is a side elevation of a slightly modified form of the mechanism.

In these drawings I have illustrated one embodiment of my invention and have shown the same as comprising a housing 11 which, as here shown, consists of a bottom plate or base 12 having means, such as slotted lugs 13, for securing the same to a supporting structure. The top wall of the housing is arranged substantially parallel with the base and has a depending flange portion 15 which rests upon the base. The top and side walls of the upper portion of the housing are preferably continuous so that they not only provide the desired support for various parts of the mechanism but also provide a dust proof enclosure therefor. The top and bottom walls of the housing are provided near the forward end of the device with bearings 16 to receive the upper or movable carbon 17 of the arc lamp. Preferably the bearings are in the form of bushings cast into the respective walls of the housing and are in vertical alinement so that the carbon will move through the same by gravity when unrestrained.

Mounted in the housing and engaging the carbon 17 is a clutch 18 which is preferably in the form of a washer clutch having an opening to receive the carbon 17 and of such a character that when the opening is in axial alinement with the bearings the carbon will move through the clutch but when the clutch is slightly tilted it will grip the carbon and hold the same against movement. Connected with the clutch is an actuating member or arm 19 which is preferably of resilient material and which, in the present instance, extends beneath the clutch for substantially the full length of the latter and is secured to the forward end of the clutch, the arm having an opening 20 through which the carbon extends. The arm may be secured to the body of the clutch in any suitable manner but preferably the forward portion thereof is provided with downwardly extending lips 21 adapted to receive the end of the arm between them and to be then bent upon the arm to secure the latter to the body of the clutch. The arm 19 extends rearwardly and is inclined upwardly, as shown in Fig. 1.

Pivotally mounted on the base 12 of the housing, to the rear of the clutch, is a lever 22 which is here shown as slotted to embrace a lug 23 which extends upwardly from the base, a suitable pin, such as a cotter pin 24, extending through the two parts of the arm and the lug to establish the pivotal connection between these parts. The forward portion of the lever is arranged substantially parallel with the base 12 and is weighted, as shown at 25. A lug 26 extends upwardly from the forward end of the lever between the weights 25 and through a slot 27 in the clutch arm 19. A pin 28 in the upper end of the lug 26 retains the arm on the lug but permits of a free relative movement of the parts. Rigidly secured to the forward portion of the lever and extending upwardly and rearwardly above the axis of the lever is a resilient arm or spring 29, the rear end of which is connected with a solenoid 30 to control the operation of the actuating device. The solenoid as here shown consists of a coil 31 wound about a metallic tube 32 which is mounted at its upper end in the base 12 of the housing and is mounted at its lower end in a supporting bracket 33 adapted to be secured to the supporting structure. Preferably the ends of the tube are cast in the base and in the bracket and the bracket is here shown as having a part 34 extending into the end of the tube to prevent the same being distorted by the contraction and expansion thereof. Slidably mounted within the tube 32 is a hollow core 35 having at its upper end an inwardly extending annular flange 36. A rod 37, preferably of non-magnetic material, extends through the hollow core and is provided at its lower end with a piston 38, the body of which is preferably formed of a graphite composition or some other self-lubricating material so that it will guide the piston in its movement and will offer little resistance to that movement. The lower end of the tube 32 being closed it will be apparent that it will act as a dash pot and cushion the movements of the piston. Coiled about the rod 37 within the hollow core is a spring 39 which is confined between the piston and the flange 36 at the top of the core and is so arranged that it will normally support the core out of contact with the piston. The upper end of the rod extends above the core and is connected with the resilient arm 29, preferably by a link 40.

The lower or stationary carbon may be supported in any suitable manner but, as here shown, I have provided a bracket 41 adapted to be secured to the supporting structure and having a vertical opening 42 through which the carbon extends. The walls at one side of this opening converge outwardly, as shown at 43, and a screw 44 is mounted at the other side of the passageway and provided with a follower 45 which engages the carbon and clamps the same against the converging walls of the passageway. The bracket is preferably made of aluminum and inasmuch as screw threads do not hold well in aluminum I have extended the screw loosely through an opening in the bracket and have arranged a nut 47 in the vertical opening 42, the nut being held against rotation by the side walls of the opening.

The solenoid may be connected in the carbon circuit in the usual or any suitable manner and when the circuit is open and the solenoid is deenergized the weighted lever 22 will move downwardly, thus permitting the clutch to release the carbon and the latter will move down into contact with the stationary carbon. When the circuit is closed and the solenoid energized the solenoid core will be drawn downwardly and the lever 22 rocked about its axis to lift the clutch, thus tilting the same and causing it to first grip the upper carbon and to then move the same away from the lower carbon to establish the arc. The movement imparted to the upper carbon will be such as to establish a normal arc and so long as the current flows through the circuit the solenoid will hold the upper carbon in separated relation to the lower carbon. The flow of an alternating current through the solenoid will impart to the core thereof a more or less pronounced vertical vibration. When the upper carbon is in its normal position with relation to the lower carbon and there is a normal flow of current through the solenoid the pull on the core will resist the vibratory movement thereof and the vibrations will be comparatively slight. These vibrations will be very largely absorbed by the resilient connection, or spring 39, between the core and the rod 37 which is connected with the clutch actuating device. Such of these vibrations as are transmitted to the spring 29 of the clutch actuating device will be substantially absorbed by that spring so that no appreciable movement will be imparted to the lever 22 or to the clutch and the clutch will remain in operative relation with the carbon. As the upper carbon is gradually consumed and the arc lengthened the resistance at the arc increases, thereby decreasing the strength of the solenoid coil. As the strength of the coil decreases the vibrations of the core become more pronounced and when the arc has attained practically its maximum length these vibrations will be of such a character that a considerable portion of them will be transmitted to the spring 29 and through this spring to the clutch, thereby causing the clutch to alternately release and grip the carbon. When the clutch moves downwardly it will engage the base of the housing and be moved into substantially axial alinement with the bearings, thus permitting the carbon to feed downwardly, but before the carbon has advanced a material distance the clutch will be again caused to grip the carbon and thus check its further movement. This alternate releasing and gripping of the carbon will continue so long as the vibrations continue to be transmitted to the clutch and the carbon will thus be fed gradually downward until it has regained its normal position with relation to the lower carbon and the normal arc has again been established, thereby decreasing the resistance at the arc and causing a normal flow of current through the solenoid which will again reduce the vibrations of the core to such an extent that they will not be transmitted to the clutch.

It will be apparent therefore that the carbon is automatically advanced periodically and that each advancement thereof takes place before the arc is broken and is of such an extent that the upper carbon is never moved into contact with the lower carbon, thereby maintaining a constant arc. The character of the mechanism is such that it will operate with equal efficiency with alternating currents of low frequency as well as with alternating currents of high frequency, an entirely satisfactory feeding operation having been secured with twenty-five cycle current. The device will also feed continuously with direct current, the core of the solenoid having sufficient vibration, as the arc lengthens, to cause the feeding of the carbon. It will be understood that the present device is designed for operation with currents of both high frequency and low frequency and that such a device requires a much greater resiliency in the connection between the solenoid core and the clutch than is required when the device is used with currents of high frequency only. The higher the frequency the less resiliency that is required in the connection. With a high frequency current, say sixty cycles, the resilient bar 29 and the spring 39 may be dispensed with and the lever connected directly with the core and a satisfactory operation secured. While the various parts of the mechanism may be of any suitable construction and any desired material I prefer that as much of the mechanism as possible shall be of aluminum in order to secure as light weight as is practical.

In order to maintain the clutch opening in line with the bearings when the carbon has been removed, the clutch has laterally extending lugs 48 which cooperate with opposed ribs 49 on the housing to limit the inward movement of the clutch. The outward movement of the clutch is limited by its contact with the end wall of the housing. Consequently the clutch opening will always be near enough in line with the bearings to enable the pointed end of the carbon to enter the same.

It will be apparent that the resilient connection between the core of the solenoid and the clutch actuating device may be established in various ways and in Fig. 10 I have shown a slight modification of the construction of the device in which the core is connected with the arm 29 by a coiled spring 46 connected at its lower end with the rod 37 and at its upper end with the spring.

While I have shown and described one embodiment of my invention, with a slight modification thereof, I wish it to be understood that I do not desire to be limited to the details thereof as various modifications may occur to a person skilled in the art.

Having now fully described my invention, what I claim as new and desire to secure by Letters Patent, is:

1. In a carbon feeding device for an arc lamp, a clutch to engage said carbon, an actuating device for said clutch, a solenoid connected in the carbon circuit and having a core, and a yieldable connection between said core and said clutch actuating device, said connection being of such a character that it will prevent the normal vibrations of said core from being transmitted to said clutch actuating device but will permit abnormal vibrations of said core to be transmitted to said clutch actuating device, thereby causing said clutch to alternately release and grip said carbon.

2. In a carbon feeding device for an arc lamp, a clutch to engage said carbon, an actuating device for said clutch, a solenoid connected in the carbon circuit and having a core connected with said clutch actuating device, and means for preventing the normal vibrations of said core for imparting operative movement to said clutch actuating device and for causing abnormal vibrations of said core to operate said clutch actuating device.

3. In a carbon feeding device for an arc lamp, a clutch to engage said carbon, an actuating device for said clutch, a solenoid connected in the carbon circuit and having a core, and a yieldable connection between said core and said clutch actuating device, said connection being of such a character that it will absorb a large part of the normal vibrations of said core and will absorb a relatively small part of the abnormal vibrations of said core.

4. In a carbon feeding device for an arc lamp, a clutch to engage said carbon, an actuating device for said clutch comprising a resilient arm, a solenoid connected in the carbon circuit and having a core, and a resilient connection between said core and the resilient arm of said clutch actuating device.

5. In a carbon feeding device for an arc lamp, a clutch to engage said carbon, a lever having operative connection with said clutch, a resilient arm connected with said lever for actuating the same, a solenoid connected in the carbon circuit and having a core, and a resilient connection between said core and the resilient arm of said lever.

6. In a carbon feeding device for an arc lamp, a washer clutch to engage the carbon, an arm secured to said clutch, a lever having operative connection with said arm, a resilient arm connected with said lever, a solenoid connected in the carbon circuit and having a core, and a resilient connection between said core and the arm of said lever.

7. In a carbon feeding device for an arc lamp, a washer clutch to embrace said carbon, a resilient arm secured to said clutch on one side of said carbon and projecting beyond said clutch on the other side of said carbon, said arm having an opening to permit the passage of said carbon, a pivoted lever having one end weighted and connected with said clutch arm, a resilient bar connected with the weighted end of said lever, a solenoid connected in the carbon circuit and having a core, and a resilient connection between said core and said resilient bar.

8. In a carbon feeding device for an arc lamp, a clutch to engage said carbon, an actuating device for said clutch, a solenoid connected in the carbon circuit and having a hollow core, a rod slidably mounted in said hollow core and connected with said clutch actuating device, and a spring interposed between said rod and said core.

9. In a carbon feeding device for an arc lamp, a clutch to engage said carbon, an actuating device for said clutch, a solenoid connected in the carbon circuit and having an axial opening therethrough, and a tubular core slidably mounted in said opening, a rod extending through said core, a piston secured to said rod beneath said core, a spring confined between said piston and the upper end of said core to hold the core normally out of contact with the piston, and an operative connection between said rod and said clutch actuating device.

10. In a carbon feeding device for an arc lamp, a washer clutch, an arm secured to said clutch, a pivoted lever having a weighted end operatively connected with said clutch arm, a resilient bar secured to the weighted end of said lever and extending beyond the axis thereof, a solenoid connected in the carbon circuit and having an axial opening therethrough, a tubular core slidably mounted in said opening, a rod extending through said core, a piston secured to said rod beneath said core, a spring confined between said piston and the upper end of said core to hold the core normally out of contact with said piston, and means for connecting said rod with said resilient bar.

11. In a carbon feeding device for an arc lamp, the combination with a washer clutch to embrace the carbon, and a resilient arm secured to said clutch, of a solenoid comprising opposed heads, a metallic tube cast in said heads, a coil wound on said tube between said heads, and a tubular core slidably mounted in said metallic tube, a piston mounted in said metallic tube, a rod secured to said piston and extending through said tubular core, a spring coiled about said rod and confined between said piston and the upper end of said tubular core, a lever having one end weighted and operatively connected with said clutch arm, a resilient bar secured to the weighted end of said lever, and an operative connection between said resilient bar and said rod.

12. In a carbon feeding device for an arc lamp, a housing having alined bearings in opposite walls thereof to receive a carbon, a washer clutch mounted within said housing, said housing having vertical ribs adjacent to said bearings and said clutch member having lateral projections cooperating with said ribs to limit the movement of said clutch member in one direction, when the carbon has been removed therefrom, the end of said clutch being arranged adjacent to the end of said housing to limit the movement of said clutch in the other direction, an actuating mechanism for said clutch, and a solenoid connected in the carbon circuit and operatively connected with said actuating mechanism.

In testimony whereof, I affix my signature hereto.

LAWRENCE C. LEOTY.